(12) United States Patent
LeFebvre

(10) Patent No.: US 8,126,772 B1
(45) Date of Patent: Feb. 28, 2012

(54) REBATE CROSS-SELL NETWORK AND SYSTEMS AND METHODS IMPLEMENTING THE SAME

(75) Inventor: Dale LeFebvre, Dallas, TX (US)

(73) Assignee: Dale LeFebvre, St. Thomas, VI (US)

( * ) Notice: Subject to any disclaimer, the term of this patent is extended or adjusted under 35 U.S.C. 154(b) by 426 days.

(21) Appl. No.: 11/504,122

(22) Filed: Aug. 15, 2006

Related U.S. Application Data

(60) Provisional application No. 60/708,219, filed on Aug. 15, 2005, provisional application No. 60/728,278, filed on Oct. 19, 2005, provisional application No. 60/777,583, filed on Feb. 28, 2006.

(51) Int. Cl.
*G06Q 30/00* (2006.01)

(52) U.S. Cl. .................................................. 705/14.34

(58) Field of Classification Search .................... 705/14, 705/14.34
See application file for complete search history.

(56) References Cited

U.S. PATENT DOCUMENTS

| | | |
|---|---|---|
| 4,890,228 A | 12/1989 | Longfield |
| 5,729,693 A | 3/1998 | Holda-Fleck |
| 5,794,207 A | 8/1998 | Walker et al. |
| 5,948,061 A | 9/1999 | Merriman et al. |
| 5,963,921 A | 10/1999 | Longfield |
| 5,991,740 A | 11/1999 | Messer |
| 6,014,645 A | 1/2000 | Cunningham |
| 6,029,149 A | 2/2000 | Dykstra et al. |
| 6,088,686 A | 7/2000 | Walker et al. |
| 6,144,948 A | 11/2000 | Walker et al. |
| 6,321,208 B1 | 11/2001 | Barnett et al. |
| 6,405,181 B2 | 6/2002 | Lent et al. |
| 6,663,002 B2 * | 12/2003 | Glaser .......................... 705/36 R |
| 6,697,824 B1 | 2/2004 | Bowman-Amuah |
| 6,748,365 B1 | 6/2004 | Quinlan et al. |
| 6,778,967 B1 * | 8/2004 | Nicholson ........................ 705/14 |
| 6,795,812 B1 | 9/2004 | Lent et al. |
| 6,847,935 B1 | 1/2005 | Solomon et al. |
| 6,865,544 B1 | 3/2005 | Austin |
| 6,877,656 B1 | 4/2005 | Jaros et al. |
| 7,006,983 B1 | 2/2006 | Packes et al. |
| 7,013,286 B1 * | 3/2006 | Aggarwal et al. ............... 705/14 |

(Continued)

OTHER PUBLICATIONS

EMO Press Release, obtained from http://www.marketwire.com/mw/release_printer_friendly?release_id=84054&category=, 5 pags, Sep. 18, 2006.

(Continued)

*Primary Examiner* — Saba Dagnew
(74) *Attorney, Agent, or Firm* — Sprinkle IP Law Group

(57) ABSTRACT

Embodiments of the invention provide a robust rebate cross-sell network in which business entities, including financial institutions, can make targeted offers, including pre-approved or pre-qualified credit offers, to a desirable consumer utilizing information submitted by the consumer during a rebate redemption process. These business entities may but need not be associated with a rebate-issuing entity (i.e., rebate sponsor) or a rebate processing center which processes rebate claims for the rebate sponsor. In one embodiment, a cross-sell network manager can determine the consumer's identity, look-up the consumer at credit bureau(s), and perform a passive, real-time inquiry. Contingent upon a plurality of factors (e.g., the results of the inquiry or look-up against the pre-approved/qualified customer list, etc.), one or more targeted offers are identified. A Web page can be dynamically generated with the selectively identified offers and presented to the consumer as disbursement options, perhaps after authenticating the consumer's identity.

25 Claims, 7 Drawing Sheets

U.S. PATENT DOCUMENTS

| | | | |
|---|---|---|---|
| 7,120,591 | B1 | 10/2006 | Solomon et al. |
| 7,146,328 | B1 | 12/2006 | Solomon et al. |
| 2002/0032791 | A1 | 3/2002 | Isherwood et al. |
| 2003/0220841 | A1* | 11/2003 | Maritzen .................. 705/26 |
| 2003/0225620 | A1 | 12/2003 | Nelson et al. |
| 2004/0111281 | A1 | 6/2004 | Witter |
| 2004/0210481 | A1 | 10/2004 | Quinlan et al. |
| 2004/0251305 | A1 | 12/2004 | Klapka et al. |
| 2005/0033639 | A1 | 2/2005 | Myers |
| 2005/0125292 | A1 | 6/2005 | Kassab et al. |
| 2005/0240473 | A1 | 10/2005 | Ayers et al. |
| 2006/0129456 | A1 | 6/2006 | Walker et al. |
| 2006/0149627 | A1 | 7/2006 | Brown |
| 2006/0190337 | A1 | 8/2006 | Ayers et al. |
| 2007/0061206 | A1 | 3/2007 | LeFebvre |

OTHER PUBLICATIONS

OnRebate.com:: Rebate offers now available from top manufacturers, obtain http://www.onrebate.com/, 2 pages, Sep. 28, 2006.

Office Action issued in U.S. Appl. No. 11/515,686 mailed Apr. 15, 2008, Dale LeFebvre, 8 pages.

Office Action issued in U.S. Appl. No. 11/544,322 mailed Apr. 21, 2008, Dale LeFebvre, 9 pages.

Patent Cooperation Treaty, International Search Report and Written Opinion issued PCT/US06/39816 mailed Aug. 21, 2008, Dale LeFebvre, 8 pages.

U.S. Patent and Trademark Office, Office Action issued in U.S. Appl. No. 11/544,322, dated Mar. 24, 2009, LeFebvre, 10 pages.

Patent Cooperation Treaty, International Preliminary Report on Patentability and Written Opinion issued in PCT Application No. PCT/US2006/039816, mailed Mar. 26, 2009, Crossfill LLC, 4 pages.

\* cited by examiner

500

Shopping

Welcome to the Sprint PCS $50 Web-Rebate™

For Sprint PCS customers with no account changes since activating service, this Web-Rebate™ will walk through the rebate process online.

| Step 1: Confirm your phone number and information | |
|---|---|
| Sprint Phone Number: | 123-555-1212 |
| ESN: | 123 |
| Sprint Billing ZIP Code: | 12345 |
| First Name: | John |
| Last Name: | Doe |
| Company Name: | Web Design Services |
| Street Address: | 742 Evergreen Terrace |
| City: | Springfield |
| State: | IL |
| Zip Code: | 12345 |
| Contact Phone: | 123-555-1212 |
| Email: | jdoe@wbs.com |

➡ ☐ Maximize your rebate!
Click here to receive valuable enhanced rebate offers from our partners and affiliates. Terms and Conditions

[ Submit ]

Select Rebate Award

Congratulations! Your $50 rebate has been approved. Please select your desired rebate award option.

Instructions: Select one of the rebate award options listed below.

Get a $30 Rebate Bonus and Get Your Rebate In Less Than 7 Days!
Option 1: $80 loaded on a pre-approved credit card.

| Select | Pre-Approved Credit Card From | Total Value | = | Rebate Amount | + | Bonus Dollars | Timing |
|---|---|---|---|---|---|---|---|
| ☐ | mbna | $80 | | $50 | | $30 | 7 Days |

Get a $5 Rebate Bonus and Get Your Rebate In Less Than 24 Hrs!
Option 2: $55 eCertificate from a leading retailer.

| Select | Shop At | Total eCertificate Value | = | Rebate Amount | + | Bonus Dollars | Timing |
|---|---|---|---|---|---|---|---|
| ☐ | amazon.com | $55 | | $50 | | $5 | 24 hrs. |
| ☐ | BEST BUY | $55 | | $50 | | $5 | 24 hrs. |
| ☐ | Home Depot | $55 | | $50 | | $5 | 24 hrs. |
| ☐ | TARGET | $55 | | $50 | | $5 | 24 hrs. |

Make A Tax-Deductable Donation.
Option 3: Donate all or a portion of your rebate to charity.

| Select | Charitable Organization | Rebate Amount | - | Donation Amount | = | Remaining Rebate | Timing |
|---|---|---|---|---|---|---|---|
| ☐ | United Way | $50 | | ☐ | | ☐ | 7 Days |
| ☐ | American Red Cross | $50 | | ☐ | | ☐ | 7 Days |

Basic Rebate
Option 4: Standard check or a prepaid debit card sent via mail.

| Select | Payment Mechanism | Total Value | = | Rebate Amount | + | Bonus Dollars | Timing |
|---|---|---|---|---|---|---|---|
| ☐ | Check or Prepaid Card | $50 | | $50 | | $0 | 10 Weeks |

Be sure to read the Terms and Conditions for each rebate award option. [ Submit ]

REBATE CROSS-SELL NETWORK AND SYSTEMS AND METHODS IMPLEMENTING THE SAME

CROSS REFERENCE TO RELATED APPLICATION(S)

This application claims priority from U.S. Provisional Patent Applications No. 60/708,219, filed Aug. 15, 2005, entitled "SYSTEM AND METHOD FOR SECURE INTEGRATION OF OFFERS IN A COMPUTER-AIDED REBATE PROCESSING SYSTEM"; No. 60/728,278, filed Oct. 19, 2005, entitled "SYSTEM AND METHOD FOR ESTABLISHMENT OF A REBATE CROSS-SELL NETWORK" and 60/777,583, filed Feb. 28, 2006, entitled "SYSTEM AND METHOD FOR REAL TIME CROSS-SELLING OVER A NETWORK" all of which are hereby fully incorporated herein by reference for all purposes.

FIELD OF THE INVENTION

This invention relates generally to rebate fulfillment. More particularly, embodiments of the present invention relate to a system and method for a rebate cross-sell network capable of marketing and selling third party products and services during an online rebate redemption process.

BACKGROUND OF THE RELATED ART

Rebates on consumer products—specifically electronics—have become a popular marketing tool for enticing consumers (e.g., individuals, entities, etc.) into making purchases. Rebates can be very cost effective for rebate-offering business entities (e.g., retailers, manufacturers, etc.) because a significant percentage of consumers making rebate eligible purchases either do not claim the rebate at all or fail to meet the rebate sponsor's terms and conditions. In industry parlance, this is known as breakage. Additionally, a meaningful percentage of the consumers who do receive a rebate check fail to cash the check prior to it expiring. This is known in the industry as slippage. Due to the combination of breakage and slippage, the actual cost of offering a rebate is only a fraction of the rebate's face value. For this reason, rather than simply reducing the price of the product, an action that would impact revenue on each unit sold, manufacturers and retailers prefer to offer a rebate. This is evidenced by the increasing ubiquity of rebate programs in the market place.

Traditionally, rebate fulfillment is a long, time-consuming if not tedious manual process in which a consumer is required to fill out a rebate claim form and mail it along with necessary paper documents such as the store receipt and proof of purchase to a rebate processing center within a specified window of time. U.S. Pat. No. 6,847,935, issued to Solomon et al., offers a computer-aided system for processing product rebates. The system of Solomon et al. includes a networked rebate processing center which allows a consumer who purchased a rebate-qualifying product to fill out an online rebate request form through the rebate processing center's processing interface. After the rebate request is successfully processed, the consumer may be given several disbursement options (e.g., cash, gift certificate, manufacturer credit, etc.). Submitting the rebate request form to and receiving the disbursement options from the rebate processing center can be viewed as two separate transactions. The former can be initiated by the consumer electronically or by mail.

To maintain breakage and prevent fraudulent claims, the system of Solomon et al. requires the consumer to print and mail the completed rebate request form affixed with a receipt and a UPC symbol. Solomon et al. suggests that a secure technique could be used to verify the authenticity of a purchase, obviating the need for a paper transmittal. To provide opportunities for breakage in such a paperless rebate process thus envisioned, Solomon et al. envision that the system would maintain numerous post purchase requirements so that a consumer would still need to go through a myriad of processes to realize a rebate. Any number of steps may halt or suspend rebate processing to wait for further actions by the user (e.g., submission of verifying materials such as receipts or UPC symbols, etc.). The rebate processing center may terminate processing at points of breakage (e.g., failed communications, failure to meet the promotion requirements, failure to submit the verifying materials, etc.) without notifying the consumer of the status.

FIG. 1 is a schematic block diagram representing a prior art rebate network and a system and method implementing the rebate network. In this example, a rebate system 100 is comprised of a rebate sponsor 110, a consumer 120, and a rebate processing center 130. Rebate sponsor 110 is representative of a manufacturer or retailer that offers rebate programs for the purchase of selective products. Consumer 120 may provide a payment 101 in exchange for a rebate-qualifying product 102 and a rebate form or instruction 103. Consumer 120 may be instructed to fill out a rebate claim 104. As exemplified in FIG. 1, consumer 120 may have a client computer 125 capable of communicating, through the World Wide Web 150, with a server computer 135 in a rebate network 140 that allows for the online submission of rebate claim 104. Rebate processing center 130 may be an independent company or part of rebate sponsor 110. In a typical rebate claim process, consumer 120 is required to mail in the rebate claim 104 and proof of purchase 105. After proof of purchase 105 is received and verified, rebate processing center 130 identifies disbursement options 107 that have been authorized by rebate sponsor 110 and generates presentation of disbursement options 106, which may be provided to consumer 120 via Web 150 after online submission of rebate claim 104 or when consumer 120 revisits the website of rebate processing center 130 and checks the status of rebate claim 104.

As described above, rebates have traditionally been a cost effective marketing tool for manufacturers and retailers (i.e., rebate sponsors) to entice consumers into making purchases on selected products. The cost-effectiveness mainly relies on breakage and slippage, which are not necessarily beneficial to consumers. Furthermore, the typical rebate claim process described above is inclusive of business entities that are part of a rebate program in the rebate network. Business entities outside of this rebate network (i.e., third parties) are not allowed to participate (e.g., cross-sell) in the rebate redemption process. There is a need for a rebate redemption process system and method which allows for cross-sell activities in a rebate network. Embodiments of the invention can address this need and more.

SUMMARY OF THE INVENTION

Increasingly, the rebate redemption processes inclusive of claims submission, status checking, as well as selection of redemption and disbursement options, are migrating to the World Wide Web ("Web"). Business entities, even those which do not traditionally offer rebates or sponsor rebate-related promotions have come to recognize the value and potential in providing consumers with a rich, instant, interactive, online experience during a rebate redemption process. As a simplified example, a rebate redemption process can be seen as having two general stages: a rebate claim process and a rebate fulfillment process. The rebate claim process focuses on claim submission (i.e., how a claim is submitted, what is the claim about, who submitted the claim, what is submitted with the claim, what kind of claim, is it valid, etc.). The rebate fulfillment process focuses on disbursement options (e.g., check, gift certificate, etc.). Most prior art rebate redemption systems and methods focus on the rebate claim process only and offer few, if any, disbursement options. Embodiments of the invention provide a system, method and apparatus that leverages data provided by a consumer during and/or before an online rebate redemption process session to provide and fulfill disbursement options, including third party offers. To this extent, the terms "rebate claim/fulfillment process" and "rebate redemption process" are used interchangeably herein.

Particularly, embodiments of the invention provide a cross-sell network manager operable to link the consumer with a plurality of business entities, even if they are not affiliated with a rebate processing center. In this way, embodiments of the invention can create a new marketing channel for third party products/services, including financial products and services. As an example, embodiments of the invention can enable financial services firms to make targeted offers of financial products to customers as they navigate the rebate claim/fulfillment process, perhaps including financial incentives such as an increase in the rebate.

One embodiment of the invention provides a data processing system that enables a network of computer-implemented rebate processing systems and third party participating systems to cross-sell products inclusive of goods and services to consumers. This is referred to herein as "the rebate cross-sell network." The rebate cross-sell network may include a cross-sell network manager operable to enable rebate processing systems and third party participating systems to securely exchange various types of rebate-related data within the rebate cross-sell network. As will be described in detail herein, the rebate cross-sell network manager may operate independent of or be fully integrated into a rebate processor or processing center. The function of the rebate cross-sell network manager is complimentary to the function of the rebate processor, as the rebate processor can connect to an independent rebate cross-sell network via the rebate cross-sell network manager. In this case, because the rebate processor is acting as an agent of the rebate sponsor, they are required to store customer data and the rebate cross-sell network of the present invention can be explicitly designed to function without storing any sensitive customer data, thereby avoiding any information security issues.

In one embodiment, the rebate cross-sell network is comprised of a rebate cross-sell network manager, one of more rebate sponsors, and one or more advertisers (i.e., third party product/service partners). Those familiar with the art will be able to see how this invention creates tangible value for all involved in the rebate cross-sell network, including the customers of the rebate sponsors. The rebate cross-sell network gives advertisers access to extremely high quality leads, which are of substantial value. In today's environment, advertisers do not have access to the online rebate claim/fulfillment experience. The rebate sponsors receive incremental revenue, in exchange for allowing advertisers to market to their customers during the online rebate claim/fulfillment experience, which could be quite substantial, contingent upon the rebate sponsor's rebate volume. The rebate cross-sell network manager will receive remuneration for enabling this commerce to take place and administering the system. Finally, the customers will benefit because they will have additional rebate disbursement options, some which may include financial incentives being offered by the advertiser (product partner), that they may find to be more attractive than the option(s) they had outside of the rebate cross-sell network. Simply, customers have greater choice.

By connecting third party advertisers to the online rebate claim/fulfillment experience, the rebate cross-sell network can create a new online marketing channel and mechanism for participating rebate sponsors and advertisers. Participating rebate sponsors will also be able to choose whether or not they want a donation to a charitable organization to be presented to their customers as a disbursement option. Here, a customer may choose to donate all or a portion of his/her rebate to a specific charity. Once the conduit between the rebate processor and the rebate network manager has been established, donations can easily be facilitated through the rebate cross-sell network.

Although the systems of the rebate processor and a specific advertiser (product partner) can be connected directly, in one embodiment, a rebate cross-sell network manager sits at the core and functions as a central router/server of the rebate cross-sell network. Having the rebate processing centers and advertisers connect through a central router/server that functions as a network manager can minimize the total number of connections that must be established and maintained in comparison to all of the participants in the network connecting to each other directly. In this optimal configuration, each network participant will only have to establish and maintain one connection, to the network manager. This network manager enables the rebate processing systems to securely exchange information regarding the consumer, applicable rebate promotions, and third party offer(s). In addition to enabling communication between the various systems connected to the rebate cross-sell network, the network manager can operate to ensure that each query sent to the rebate network gets routed to the appropriate advertisers, based upon the rules that have been established by the rebate sponsor for each promotion, in the proper format for each respective system. The rebate network manager can also operate to track all of the interactions that take place across the rebate network, and provide the reporting necessary to optimize sales and provide performance-based remuneration to network participants. This will allow each participant in the network to only have to maintain one trade relationship, with the network operator, versus having to manage trade relationships with all other participants to whom a direct connection exist.

The advertising opportunities created within the online rebate claim/fulfillment experience can be appealing to companies from a wide variety of industries. In addition, the ability to obtain customer data that allows an advertiser to confidently identify potential customers can be of particular interest to those companies that typically make pre-screened and/or customer-specific offers (e.g. financial service firms). In embodiments of the invention, the cross-sell network manager may utilize information already provided by a consumer during a rebate redemption process to enable pre-approved and/or pre-qualified credit offers to be made instantly to the consumer. Embodiments of the invention may track user interactions, offer eligibility decisions (e.g., credit decisions), offers made, responses to offers, etc. The cross-sell network manager may operate to link the consumer interaction during the rebate redemption process or a portion thereof to appropriate credit decision-making and marketing platforms. The cross-sell network manager may implement any mechanism through which a consumer can be identified, authenticated, and provided with one or more targeted offers. By linking the rebate processor(s) to the appropriate credit decision-making and marketing platforms, in one embodiment, the invention can enable financial services firms to make pre-screened offers of financial products to customers as they navigate the online rebate redemption process. Beyond providing access to online consumers, the invention can enable participating advertisers to (1) identify potential customers, (2) authenticate and/or confirm the identity of a particular consumer, and (3) provide a targeted offer(s). The targeted offer(s) can be made based upon any combination of the consumer's purchase history, credit bureau attributes, custom advertiser modeling, and the consumer's pre-existing relationship with the advertiser, etc. To enable performance-based remuneration, embodiments of the invention may perform requisite actions required by all participants. The online rebate redemption experience can encompass all of the interactions that take place during the end-to-end rebate redemption process inclusive of claim submission, status checks, confirmations, and selection of redemption and disbursement options. In one embodiment, the end-to-end rebate redemption process occurs in one online rebate processing transaction.

One embodiment of a system and method disclosed herein can establish a rebate cross-sell network that will enable rebate sponsors to securely integrate targeted and non-targeted offers from a set of pre-selected advertisers that are participating in the network into the online rebate redemption process for post-purchase rebates. The online rebate redemption process for post-purchase rebates encompasses all of the interactions that take place during the end-to-end rebate redemption process inclusive of claim submission, status checks, confirmations, and selection of redemption and disbursement options. By participating in the rebate cross-sell network, the advertisers will not only gain access to rebate-redeeming consumers during the online post-purchase rebate redemption experience, they will also gain access to information about the rebate-eligible purchase that has been made, the nature of the rebate promotion to which one or more consumers are responding, and perhaps most importantly, the personal data that a consumer has provided in order to claim his/her rebate. This information can be used by the advertiser(s) pre-selected by the rebate sponsor to generate a highly relevant offer or set of offer(s) of third party products (i.e., goods/services) that, in one embodiment, are securely and unobtrusively presented to the customer along with his/her other rebate disbursement options.

One technical advantage of the invention pertains to the ability to instantly, passively, and transparently determine whether an offer should be made to a particular consumer, thereby avoiding the negative customer experience associated with offering customers a credit product only to have the customer declined when they accept the offer later. The advantage includes the ability to effectively target online consumers during the rebate redemption process rather than having to make untargeted offers that often lead to unprofitable accounts, relationships, or sales. The difficulty in verifying the identity of online users precludes making the kind of targeted, pre-screened offers that are routinely extended via direct mail, telemarketing, and during face-to-face interaction in retail stores, but with the advent of the rebate cross-sell network disclosed herein, advertisers will have user data that is not available through other existing online advertising alternatives. For those relationship-focused advertisers that are in the business of making offers based upon how a consumer will perform in the future (e.g. financial services firms), the ability to identify a particular consumer in a permission-based environment will enable them to proactively make highly relevant, customer-specific offers that generate higher response rates, rather than having to rely solely upon key-word based, contextually-relevant targeting. Through the cross-sell network of the present invention, the advertiser can both offer relevant products/services during the rebate processing transaction, but also potentially even initiate the ultimate sales transaction (and potentially enable a mechanism to conclude the sale).

Another technical advantage of the invention pertains to the ability to filter out individuals who are actively seeking credit products. As one skilled in the art can appreciate, the credit-seeking segment of the market does not perform as well as non-credit seeking populations, as the credit-seeking segment of the market tends to be most in need of credit and therefore, more risky.

Yet another technical advantage of the invention pertains to the ability to present an offer (e.g., a credit offer) to a rebate-redeeming consumer with incentives (e.g., a financial incentive) to accept the offer. For example, if the consumer qualifies for a $50 rebate and accepts an offer to apply for a pre-approved credit card with an instant $60 credit, the value of the rebate is increased by $10.

Yet another technical advantage of the invention is that third party offers (e.g., a credit offer) can be presented to the rebate-redeeming consumers in a way that positions it as a consumer benefit arranged by/provided through the rebate sponsor. Following the above example, even though the credit offer is made by a third party advertising partner, a consumer may see the increase in the rebate value as a benefit arranged by the rebate sponsor, thus enhancing the goodwill of the rebate sponsor.

Yet another technical advantage of the invention is the ability to create a new sales/marketing/advertising channel/space/forum that can enable advertisers (e.g., third party financial services firms) to effectively target prospects and acquire new customers at a significantly lower cost than traditional marketing channels such as direct mail, retail stores, and telemarketing, etc. Furthermore, through embodiments of the invention, advertisers can effectively identify and present targeted credit offers to a large volume of desirable, highly motivated consumers in a very cost effective and non-obtrusive manner, as each targeted consumer will already be in the middle of a financial transaction (i.e., a rebate claim/fulfillment process) that he/she chose to initiate. Therefore, the commerce created by the rebate cross-sell network could prove to be a highly attractive sales channel for advertisers attempting to reach consumers online. It should also be noted that this is designed to be an entirely passive process that will transparently run in the background, and has no impact on a consumer's credit rating with any post-session marketing being at the discretion of the rebate sponsor. Unlike traditional online affiliate advertising networks that simply track referral-based electronic commerce, this system enables an attractive marketing opportunity that does not exist in today's environment. Moreover, this system can be seen as counter-intuitive to the traditional rebate redemption processing systems and methods because they primarily focus on maintaining breakage and/or slippage, not on encouraging rebate-redeeming consumers to complete the rebate redemption process.

Yet another technical advantage of the invention is that by enabling third party advertisers (e.g., financial services firms and other business entities alike) to identify and make targeted offers to desirable consumers much more cost effectively, a significant amount of value can be created during a rebate redemption process. This added value can be shared with all parties in the rebate cross-sell network, including rebate sponsor(s) (e.g., OEM, distributor/retailer, etc.), rebate processing center(s), third party seller(s) (i.e., advertisers), and perhaps most importantly, consumers.

Other objects and advantages of the present invention will become apparent to one skilled in the art upon reading and understanding the detailed description of the preferred embodiments described herein with reference to the following drawings.

BRIEF DESCRIPTION OF THE DRAWINGS

A more complete understanding of the present invention and the advantages thereof may be acquired by referring to the following description, taken in conjunction with the accompanying drawings in which like reference numbers indicate like features.

FIG. 5 is a diagrammatic representation of a screenshot illustrating a step in an online rebate redemption process, according to one embodiment of the invention.

FIG. 7 is a diagrammatic representation of a screenshot illustrating different types of offers presented to a qualified rebate-redeeming consumer during an online rebate redemption process, according to one embodiment of the invention.

DETAILED DESCRIPTION

Figure 1:
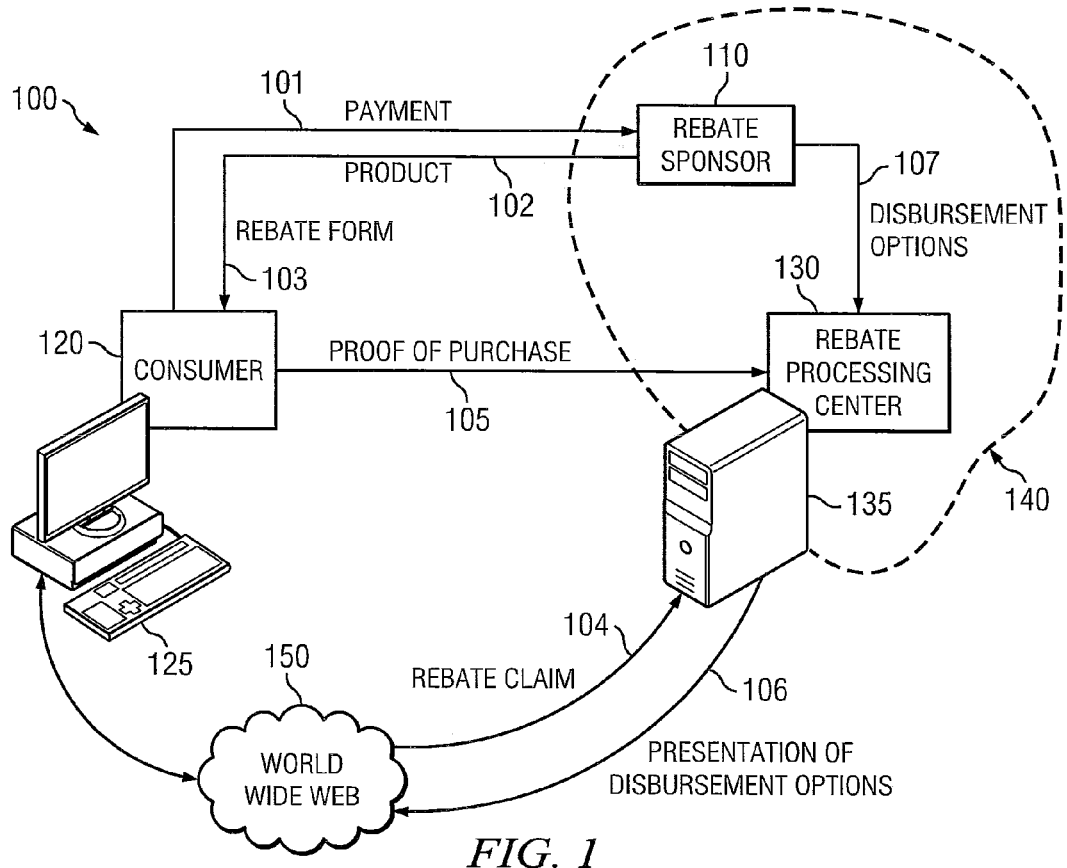
FIG. 1 is a schematic block diagram representing a prior art rebate network.

The present invention and various features and advantageous details thereof will now be described with reference to the exemplary, and therefore non-limiting, embodiments that are illustrated in the accompanying drawings. Descriptions of known programming techniques, computer software, hardware, network communications, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before describing embodiments of the invention in detail, it might be helpful to clarify a few terms used in this disclosure. A business entity can be any seller or any intermediary or agent thereof of goods and services (e.g., retailer, manufacturer, distributor, provider, producer, proprietor, etc.). A business entity may be for profit or not for profit. The term "business entity" includes any and all communications and processing equipment (e.g., computer-readable media, computers, data storage devices, computer networks, etc.) used or maintained by any such business entity. A rebate sponsor is an entity that offers and/or sponsors one or more rebate programs. A rebate sponsor may be a business or a non-business (e.g., a government agency) entity. A consumer can be any individual or any entity that purchases products and includes any communications and/or processing equipment used or maintained by any such consumer. A product can be a good and/or a service. A consumer may purchase a product from a business entity directly or indirectly. Products which are associated with rebate sponsors are referred to as the primary products. Products which are not associated with rebate sponsors are referred to as the secondary products. Consumers are referred to as the first party. The rebate sponsors, typically the manufacturers or retailers of the primary products, and their agents and assigns (e.g., RPC 130) are referred to as the second party. Retailers of the secondary products are referred to as the Third Party or Advertisers. The term "consumer" is used herein interchangeably with the term "customer". For example, a rebate-redeeming consumer is considered a customer of the rebate cross-sell network, notwithstanding the trade or transactional relationship between the first party and the third party. A network can be seen as any collection of components associated with a public switched telephone network, local area network, wide area network, intranet, distributed computer system, global computer network such as the Internet, the World Wide Web, or any combination thereof. Suitable network components may implement any number and any type of wireline and/or wireless communications technologies for transmitting voice/data or other information from point to point. A "rebate processing center" is any set of people, machinery, buildings, etc. that process rebates on products/services purchased by consumers using rebate promotions established by rebate sponsors such as manufacturers, distributors, and/or retailers. This can include an internal department of the rebate sponsor, or it may be outsourced to an external service provider. The term "rebate collateral" refers to materials, information, or a combination thereof required by a rebate sponsor to prove that a consumer has made a rebate eligible purchase and is entitled to the associated rebate, including but not limited to the purchase receipt, a unique rebate/transaction code, proof of purchase, product packing labels, invoice, UPC bar code, product model and serial numbers, rebate coupon, rebate claim form, and any other materials or information. A "disbursement option" is a choice presented to a consumer as payment for his/her rebate. In addition to representing a particular delivery mechanism to disburse the funds or something of value to a consumer, a disbursement option may define:

1. What?—For example, what will the consumer receive, what form will the remuneration be in and how can this currency be used, what is the value of what the consumer will receive, and so on.
2. When?—For example, when the consumer will receive the rebate.
3. How?—For example, how will the rebate be sent. This includes the actual disbursement mechanism (i.e. check, ACH, prepaid card, electronic coupon, etc.).

Embodiments of the present invention can leverage data submitted during a rebate redemption process to provide additional offers on products, including third party goods and services, to rebate-redeeming consumers. Embodiments of the present invention include a rebate cross-sell mechanism, which can be implemented as an independent rebate cross-sell network manager, in conjunction with a rebate processing center, or fully integrated into the rebate processing center (e.g., as a full service online rebate fulfillment center that processes and fulfills rebates). A rebate offer or rebate sponsor (e.g., a manufacturer) may integrate the functionality of such an online rebate fulfillment center or outsource it to a rebate clearinghouse company. A rebate sponsor operating its own rebate processing center may integrate the functionality of a cross-sell network manager. Other implementations are also possible, so long as they implement the functionality of a rebate cross-sell network manager disclosed herein for managing rebate cross-sell activities during a rebate redemption process and routing rebate-related information to appropriate destinations in a rebate cross-sell network accordingly.

As an example, one embodiment of the rebate cross-sell network manager can, during an online rebate fulfillment session, enable an authorized advertiser to determine a consumer's identity, look-up the consumer at one or more credit bureaus, and perform a passive, real-time bureau inquiry (preferably a multi-bureau prescreen-of-one) or check to see if the consumer is on an existing pre-approved/qualified customer list. In one embodiment, such a list can be derived by applying credit qualification criteria to information obtained from a credit bureau along with other financial, segmentation, and consumer response models. Contingent upon the results of the bureau inquiry or look-up against the pre-approved/qualified customer list, the rebate-eligible product purchased by the consumer, and the consumer's relationship with the advertiser, one or more specific product offers can be identified and provided to the consumer. For example, if the consumer is pre-approved/pre-qualified for a particular credit card offer, after authenticating the user's identity, a Web page is dynamically generated with the credit card offer and presented to the consumer (e.g., though the rebate processing center) during the rebate redemption process. In this way, consumers consummating rebate processing transactions via the Web can be offered additional rebate redemption choices during a single rebate fulfillment transaction.

In one embodiment, the additional choices may include monetary incentives such as an increased rebate value for accepting a particular financial product (e.g., a credit card or line of credit, etc.). In one embodiment, the additional choices may include one that is immediately redeemable (e.g., redeemable online) but is valued at less than the total rebate available. As an example, a consumer who is requesting a $50 rebate can be offered an instant $40 coupon/credit at an online retailer (e.g., Amazon.com). If the consumer selects and accepts this offer, the original $50 rebate is assigned to the third party (e.g., network owner or advertiser) that enabled the immediately redeemable $40 coupon/credit offer. In this example, the consumer exchanges $10 in rebate value for the ability to spend $40 immediately without having to endure the delay or go through the entire rebate redemption process, thereby avoiding breakage and slippage. The aforementioned third party in turn can utilize the $50 rebate, the exchange transaction data, and the consumer information to perhaps negotiate trade with other parties for further value exchanges.

The ubiquity of consumer product rebates, and the desire to redeem these product rebates leads to a high volume of motivated consumers. In prior rebate processing systems, consumers must navigate through a cumbersome, often intentionally so, rebate redemption process in order to obtain their rebate. Having an option to redeem a rebate immediately and avoid potential breakage and slippage as described above can be a highly desirable feature, particularly advantageous to consumers. By integrating third party offers, embodiments of the invention also widen the range of rebate disbursement options for consumers, while creating a new sales/marketing/advertising channel for a virtually unlimited amount of third party products, including financial service products.

In an effort to maintain desirable growth and profitability, financial services companies have been aggressively looking for ways to make offers for financial products/services and acquire customers online in a cost effective manner. To date, the primary challenge with accounts generated through an online channel has been profitability. These accounts have not performed well relative to the accounts generated through more traditional (direct mail, retail, telemarketing, etc.) channels. Reasons for the poor performance can be many. For example, online marketers have historically leveraged promotional banner ads or hyperlinks on Web sites with a high volume of traffic (e.g., search engines) to generate awareness. One problem with this approach is that these banner ads and hyperlinks are not targeted based upon a consumer's identity or other accessible data on a consumer's financial history. In the offline world, most financial institutions have migrated to leveraging credit bureau and customer relationship data to make targeted offers specifically to desired customers. The difficulty in verifying the identity of online users makes it very challenging to make the kind of targeted offers that are routinely extended via direct mail and during face-to-face interaction in retail stores. To use the credit card industry as an example, over the past five years, mail volumes have increased dramatically. In 2004, according to Synovate, annual mail volume reached an all time high of 5.23 billion pieces, which was up 22% as compared to 2003. At the same time, overall response rates have continued to decline, reaching an all time low of 0.4% in 2004. These trends have led to skyrocketing customer acquisition costs, which have forced credit card issuers to aggressively seek alternative sales and distribution channels. Embodiments of the invention can be particularly useful in offering financial service products to consumers because (1) rebate-seeking consumers are highly motivated consumers, (2) a rebate redemption process is already a financial transaction, and (3) the information that a consumer must submit for claiming a rebate can lead to an information rich environment that is excellent for targeted marketing of financial services products.

Figure 2:
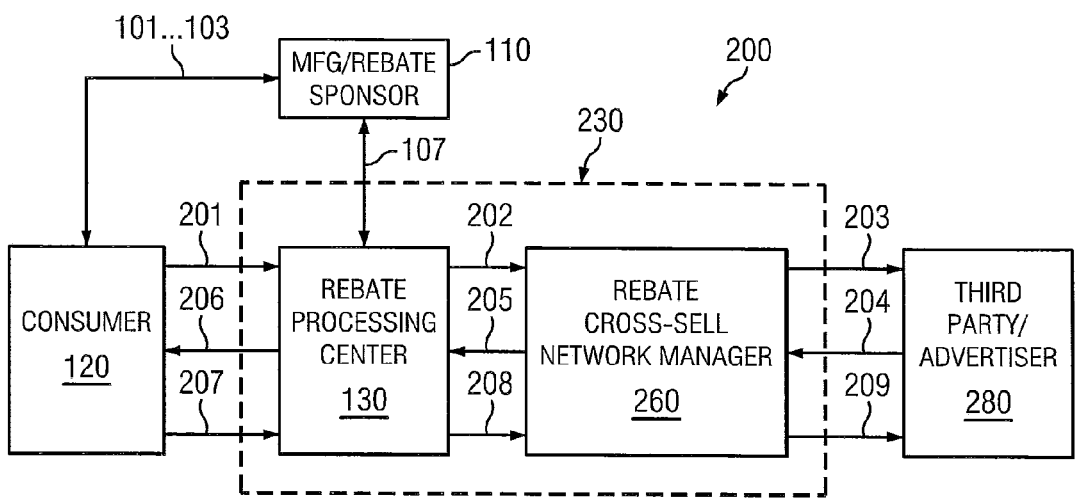
FIG. 2 is a schematic block diagram representing the rebate cross-sell network architecture and illustrating a rebate cross-sell mechanism for offering products and services to a consumer during a rebate processing and fulfillment transaction, according to one embodiment of the invention.

FIG. 2 is a schematic block diagram representing the rebate cross-sell network architecture and illustrating a rebate cross-sell mechanism for offering products and services to a consumer during a rebate processing and fulfillment transaction, according to one embodiment of the invention. In this simplified example, Rebate Cross-Sell System 200 comprises Rebate Sponsor 110 which provides the primary products, Consumer 120, Rebate Processing Center ("RPC") 130, Rebate Cross-Sell Network Manager ("Network Manager") 260, and at least one Third Party 280 which provides the secondary products of goods and/or services. Network Manager 260 can be implemented to operate independently from or in conjunction with RPC 130. Network Manager 260 can be implemented at a server (e.g., at a Web server of Rebate Sponsor 110 or RPC 130). Rebate Sponsor 110 and RPC 130 may form a rebate network which integrates or communicates with one embodiment of Network Manager 260. In one embodiment, RPC 130 and Network Manager 260 are integrated to form Online Rebate Fulfillment Center ("ORFC") 230. Rebate Cross-Sell System 200 may be implemented as one comprehensive computer program or a combination of several programs. For example, Network Manager 260 may be implemented as a software product embodied in computer-executable instructions carried on a computer-readable medium familiar to those skilled in the art. The computer-executable instructions may comprise one or more customized software tools configured to make credit decisions according to certain policies and/or rules (e.g., business rules). The various implementations of Rebate Cross-Sell System 200 can be transparent to Consumer 120.

An exemplary embodiment of a rebate cross-sell method for offering primary as well as secondary products and services to a consumer during a rebate processing and fulfillment transaction will now be described. Steps 101 ... 103 and step 107 are similar to those described above with reference to FIG. 1. At step 201, Consumer 120 initiates a rebate fulfillment transaction electronically and provides the required rebate claim data to RPC 130. Information provided by Consumer 120 during this transaction session may include personal information (e.g., name, address, phone number, email address, etc.) and any rebate eligibility collateral (e.g., a unique rebate identification code) to RPC 130. RPC 130 is operable to create and manage rebate programs for Rebate Sponsor 110. The rebate programs are designed to entice Consumer 120 to purchase the primary products of Rebate Sponsor 110.

As one skilled in the art can appreciate, all communications in Rebate Cross-Sell System 200 can occur via the global communications network (i.e., the Internet). RPC 130 can be made accessible to Consumer 120 via the Web as known to those skilled in the art. It is possible for Consumer 120 to initiate a rebate fulfillment transaction by submitting the rebate request form received from the rebate sponsor and the collateral required for proof of purchase through other means (e.g., via a non-electronic or non-networked channel or channels such as standard postal mail or fax). RPC 130 may comprise one or more data entry interfaces which can electronically capture data from rebate request forms not submitted through the Internet.

In addition to creating and managing rebate programs for Rebate Sponsor 110, RPC 130 is operable to determine the eligibility of primary product rebate claims, fulfill the primary product rebates, manage rebate fraud, provide payment facility/mechanism for the primary product rebates, disburse the primary product rebates, and manage campaigns designed to drive Consumer 120 to use Web-based rebate functionality provided by RPC 130. In embodiments implementing ORFC 230, the functionality of RPC 130 can be fully integrated into ORFC 230.

After accepting the rebate claim data from consumer 120, RPC 130 sends an offer query to Network Manager 260 at step 202. As exemplified in FIG. 2, one embodiment of a rebate cross-sell network manager (e.g., Network Manager 260) can interface between at least one rebate processing center (e.g., RPC 130) and at least one advertiser of the secondary products/service (e.g., Third Party 280) to manage the offering of the advertiser's product/service to consumers (e.g., Consumer 120) during a rebate redemption process. The rebate cross-sell network manager is operable to perform a plurality of functions, including, but not limited to, establishing and managing the relationships between rebate sponsors, rebate processing center(s), and advertiser(s), tracking and reporting offers made, storing and reporting offers accepted by consumers, managing performance-based payments (e.g., managing payments from advertisers to rebate sponsors, managing payments to consumers, managing payments from rebate sponsors to charitable organizations per rebate disbursement choices made by consumers, etc.). The rebate cross-sell network manager enables communication among the various systems in the rebate cross-sell network by structuring and properly routing queries to each connected system.

In this example, Network Manager 260 receives the offer query from RPC 130, determines the appropriate destination to route the query based upon the rules established by Rebate Sponsor 110 for the promotion (i.e., rebate program) which Consumer 120 has responded to, and sends a structured query to Third Party 280 (e.g., credit card provider) at step 203 to, if necessary, initiate a pre-screening process.

Third Party 280 receives the structured query, processes the query to extract pertinent data (e.g., personal information of Consumer 120 submitted at step 201) and provides a response to Network Manager 260 at step 204. The response may include either a denial of any offer to Consumer 120 (which may or may not be forwarded to Consumer 120) or one or more potential offers based on the availability of the secondary products/services and the qualification of Consumer 120. Advertiser/Third Party 280 is operable to perform a plurality of functions, including, but not limited to, selling the secondary products of goods and/or services (e.g., a credit card), performing approval processing if necessary (e.g., credit approval of Consumer 120 and credit limit analysis), providing the product to Consumer 120 if Consumer 120 accepts the offer (e.g., credit card fulfillment to Consumer 120), payment of a finder's fee or bounty to Network Manager 260 (e.g., a fee for facilitating the sale of the credit card product to Consumer 120), managing the service, if necessary (e.g., credit card account management), and optionally paying the incentive offered to Consumer 120 as a part of the solicitation (e.g., increases the rebate from the amount on the primary product to a greater amount to provide incentives for Consumer 120 to purchase the secondary product). Readers are directed to the following references, which are incorporated herein by reference, for related teachings on systems and methods for performing on-line credit reviews, approval of credit applicants, credit processing, credit card reservations and processing, providing on-line credit card applications and instant issuance of credit cards: U.S. Pat. Nos. 6,877,656 B1 to Jaros et al., 6,795,812 B1 to Lent et al., 6,405,181 B2 to Lent et al., 6,144,948 to Walker et al., 6,088,686 to Walker et al., 6,014, 645 to Cunningham, and 6,029,149 to Dykstra et al.

Network Manager 260 receives the query responses from Advertiser(s) 280 and provides a structured query response with the offer(s) to RPC 130 at step 205. In an alternative embodiment, Network Manager 260 can also provide additional incentives to Consumer 120 in the form of an immediately consumable online rebate in exchange for the full rebate provided by Rebate Sponsor 110 that must be further processed and cannot be received by Consumer for a period of time (e.g., 60-90 days). Such an online rebate offer can be provided to Consumer 120 in a message sent back to Consumer 120 so that it is immediately acceptable by Consumer 120. For example, a code may be provided to Consumer 120 upon Consumer accepting the lower value rebate (e.g., by clicking on an "I accept" button). As another example, Network Manager 260 might provide to RPC 130 (for further provision to Consumer 120) an offer to provide Consumer 120 a reduced amount rebate that is immediately redeemable in exchange for the full but not immediately redeemable rebate (both can be presented to Consumer 120). In this way, Consumer 120 can choose to accept the full manufacturer rebate (e.g., $100) and wait for a check from Rebate Sponsor 110 to arrive in 60-90 days or to accept an immediately redeemable coupon or certificate ("eCertificate") from an online business (e.g., an $80 eCertificate that is immediately redeemable at amazon.com). In this embodiment, Network Manager 260 would arrange for the coupon or eCertificate with the online store or service provider (e.g., amazon.com) and would arrange with Rebate Sponsor 110 to have the $100 rebate sent to Network Manager 260 if Consumer 120 accepted the $80 online coupon. In this example, Consumer 120 would get immediate satisfaction of the rebate, Network Manager 260 would get the $20 upside for waiting 60-90 days of processing, and Rebate Sponsor has a satisfied customer because one of the biggest complaints about rebate programs is that it takes too long for a consumer to receive the money with the rebate. Alternatively, the $80 immediate rebate payment could either be electronically deposited into an account designated by Consumer 120 or a check can be mailed the next day.

RPC 130 receives the structured query response from Network Manager 260 and presents the various rebate options and offers to Consumer 120 at step 206. Consumer 120 reviews the options and selects the desired rebate option/offer package. The selection information is transmitted to RPC 130 at step 207. RPC 130 may forward the rebate/offer choice made by Consumer 120 to Network Manager 260 at step 208 (e.g., if Consumer 120 accepts either an immediately redeemable lower value rebate or one of the offer(s) from Advertiser 280). Network Manager 260 then informs Advertiser 280 of Consumer 120's acceptance (or lack thereof) at step 209. Where applicable, Advertiser 280 then operates to fulfill the offer accepted by Consumer 120 (e.g., by processing the transaction and providing Consumer 120 with the credit card thus selected).

Figure 3:
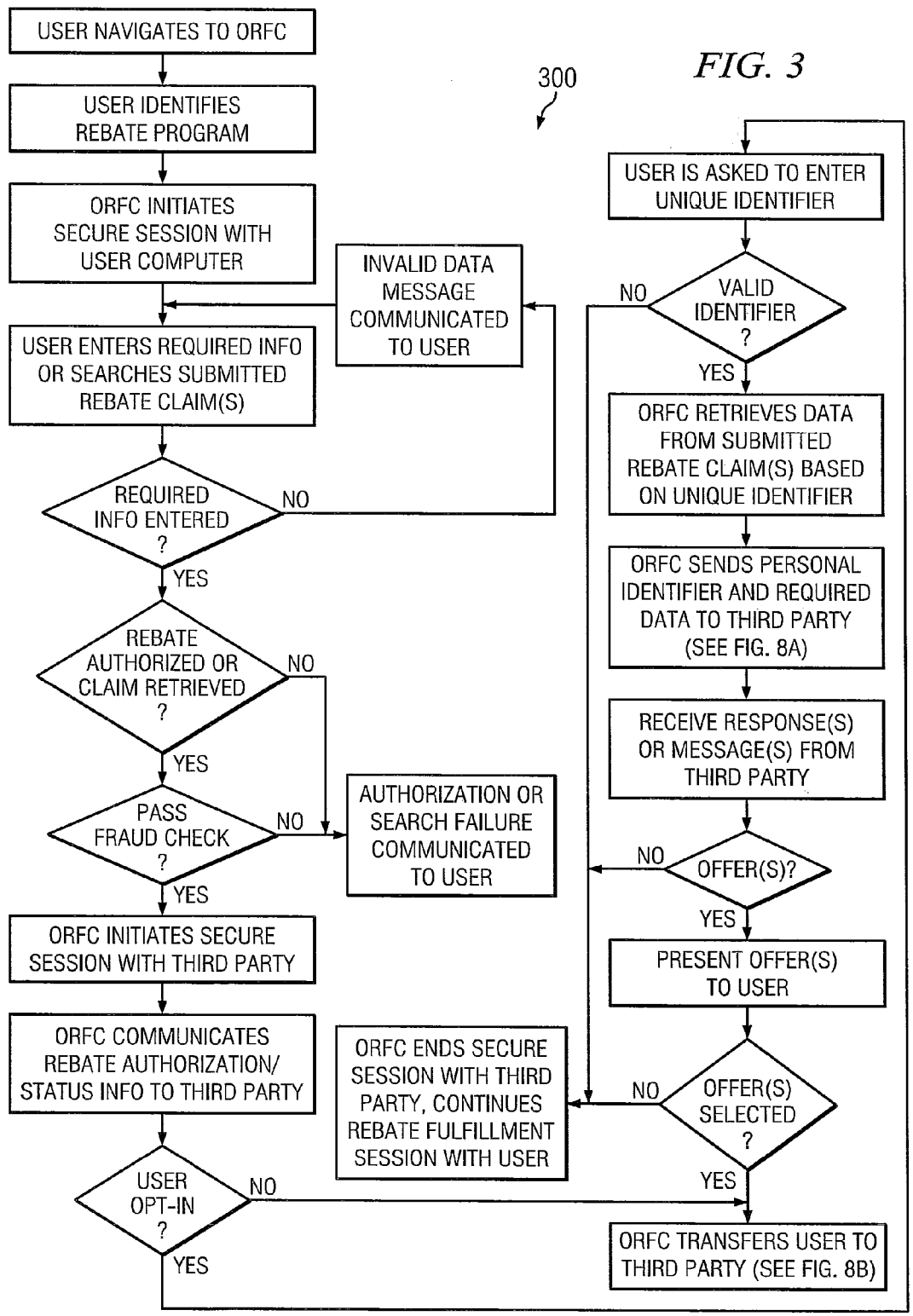
FIG. 3 is a flow diagram representing the functionality of an online rebate fulfillment center in a rebate cross-sell network, according to one embodiment of the invention.

FIG. 3 is a flow diagram 300 representing the functionality of ORFC 230 of Rebate Cross-Sell system, according to one embodiment of the invention. In this example, ORFC 230 is implemented as an online rebate fulfillment website ("ORFC") of a rebate processing center which processes rebate programs related to product promotions by Rebate Sponsor 110. Flow 300 starts when Consumer 120 ("User") interactively accesses ORFC through a dynamic interface according to consumer information, promotion, or other appropriate data. User identifies through the interface a specific rebate program or locates the search functionality that can be used to find a specific rebate program or to check the status of a previously submitted rebate claim. Because personal information is being conveyed, ORFC initiates a secure session over the network to User. User enters the information required for the rebate claim or enters the necessary search keys to look-up a previously submitted claim. In one embodiment, ORFC utilizes error checking algorithms within the web form to determine if all of the required data fields have been populated and if syntax of the information entered is correct. If so, ORFC accesses a promotional table containing current rebate programs to determine if the rebate claim qualifies for the promotion or in the case of a previously submitted claim, searches the transactional table to locate the existing claim. If data is incomplete or the syntax is incorrect, ORFC returns an error message, and requests that the information be re-entered.

If the rebate claim is not authorized, ORFC returns a failure message to consumer along with the appropriate explanation. If the rebate claim is authorized (which may be contingent upon receipt of required rebate eligible collateral) or the search of the existing claim is successful, ORFC performs appropriate fraud screening(s). If User passes the fraud check, ORFC 230 initiates a secure session (e.g., via Network Manager 260) with Advertiser 280 ("Third Party") and routes a query to an online marketing platform of Third Party. It should be understood that ORFC can send inquiries to multiple third party advertisers. Examples of the functionality of Third Party are described below with reference to FIG. 8A and FIG. 8B. It should also be understood that ORFC can handle rebate programs for and interface with multiple rebate sponsors.

ORFC communicates the rebate authorization/status to User along with an opt-in to receive promotional offers. This opt-in is an optional step that may be required by a rebate sponsor or per governmental privacy guidelines. The opt-in can also be done at step 201 of FIG. 2, as illustrated in Screenshot 500 of FIG. 5. If the opt-in step is implemented and User does not opt-in, ORFC may bypass the cross-sell (solicitation) process and continue the rebate redemption process. ORFC may automatically transfer User directly to Third Party or open a window to display products of Third Party.

If User opts-in to receiving promotional offers, User is asked to enter a personal identifier. If User does not submit a personal identifier or if the personal identifier is found to be not valid, ORFC ends the secure session with the offer-decisioning platform. If User enters a valid personal identifier, ORFC retrieves User's name and address from the transaction table. ORFC then operates to construct a query that includes User's name and address, along with desired information about the promotion that is being redeemed. The offer-decisioning platform utilizes the information in the query to determine whether User passes pre-credit bureau screening criteria. In an alternative embodiment, User may be matched to an existing list of pre-screened consumers. If User does not pass, the offer-decisioning platform returns a decline message to ORFC (via Network Manager 260), which continues the normal rebate claim/fulfillment process flow transparently to User. If User passes the pre-bureau screening, the credit decisioning platform pulls a credit bureau inquiry on User.

Once User's credit bureau is obtained from one or multiple credit bureaus, Third Party may evaluate User's credit report to determine eligibility for an offer. If User passes the credit bureau test(s), the offer-decisioning platform then conducts optional post-bureau fraud tests. If User passes the post-bureau tests, the decisioning platform then routes a response to the query back to ORFC (via Network Manager 260) that includes an approval with an offer. ORFC then presents the pre-screened credit offer(s) to User along with any and all other rebate disbursement options. If User chooses to accept the pre-screened credit offer, ORFC then transfers User to Third Party's pre-screened offer confirmation application. As described above, if the optional opt-in step is implemented and User does not opt-in, User may still be transferred to Third Party as an opt-out prospect. However, since the cross-sell credit pre-screening process is bypassed, there will be no pre-screened credit offers from Third Party.

Embodiments of the present invention can be realized in a data processing system particularly designed and configured to operate one or more servers interconnected via communication transmission lines to allow data links there between. An illustrative embodiment of the present invention can include program controlling logic placed on a first server (e.g., a rebate processing server) that forwards data provided by a user while initiating his/her rebate claim (either online or via a form that was mailed-in) to a second server where a rebate cross-sell network management router or network manager resides. The rebate cross-sell network manager can include program controlling logic commands that, when executed by a processor, operate to identify the related rebate program, determine the third party products to be offered and the provider hierarchy, structure a query that is compatible with the provider's credit decisioning/offer platform for the identified product, and route the query accordingly. When a response to the query is received, the network manager can record the response (e.g., for tracking and sales optimization purposes), translate the response into the structure required by the originating rebate processing system, and again route it to an appropriate destination. The network manager can include the requisite programming logic to track and report on the level of activity associated with each rebate program.

Figure 4:
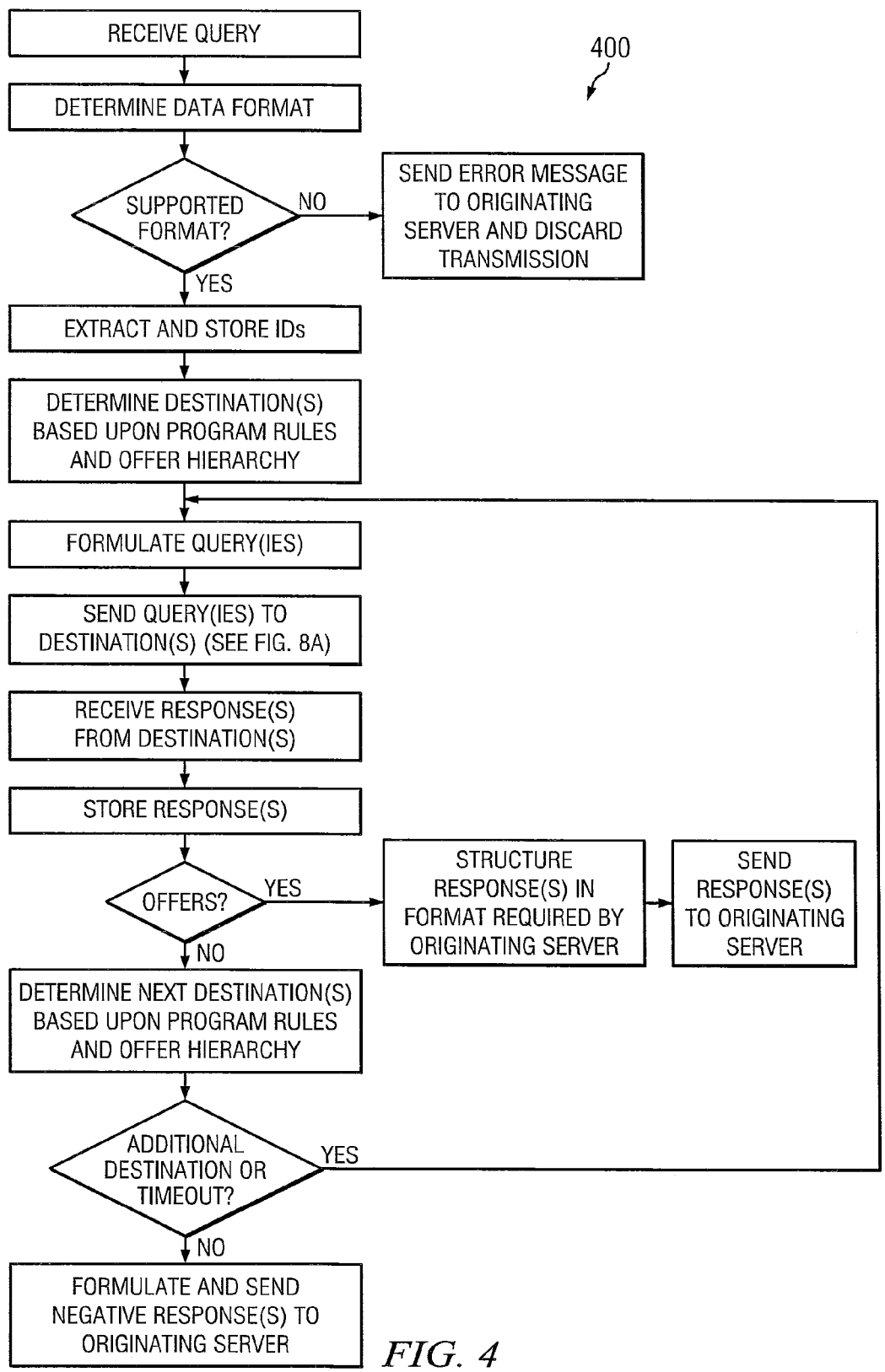
FIG. 4 is a flow diagram representing the functionality of a rebate cross-sell network manager, according to one embodiment of the invention.

FIG. 4 is a flow diagram 400 representing the functionality of Network Manager 260 of FIG. 2, according to one embodiment of the invention. In this example, Network Manager 260 receives a query from RPC 130, including information provided by Consumer 120. Network Manager 260 operates to determine the data format of the query from RPC 130. If the data format is not supported by Network Manager 260, an error message is sent to RPC 130 and the transmission is discarded. Otherwise, Network Manager 260 operates to extract necessary data from the query (e.g., source ID, program ID, transaction ID, user identity, etc.) and store the extracted data accordingly (e.g., in a database, table, file, etc.). Network Manager 260 is operable to determine where to obtain additional offers for Consumer 120 based on predetermined program/business rules and offer hierarchy. The following is a non-exhaustive list of rules that may be implemented by Rebate Cross-Sell System 200:

Allowable offer types
Allowable advertisers
Minimum consumer incentive for each offer type
Minimum bounty, distribution partner payment per sale, for each offer type
Maximum number of offers to be presented for each offer type
Offer type presentation hierarchy
Display type (textual, graphic, combination)
Restricted types of content
Maximum offer presentation frequency
Data fields that can be shared with explicit consumer permission
Data fields that can be shared without explicit consumer permission
Acceptability of post-transaction/session marketing to user
Communication protocols (lead formatting, security, encryption)
Allowable distribution partners
Allowable originating transaction/session types
Minimum primary transaction value
Acceptability of simultaneous presentation of competing offers
Post-selection user confirmation requirement
Minimum data requirements for leads
Advertising budget
Offer selection algorithm
Historical offer response rates
Historical responses of specific consumer
Historical lead pricing for each offer type
Financial agreements with advertising partners
Financial agreements with distribution partners
Test and learn for introduction of new offers without historical data
Maximum offer query response time(s).

Once the appropriate destination(s) is determined (e.g., Third Party 280), Network Manager 260 operates to formulate or otherwise construct one or more queries and forward them to the determined destination(s). The query thus constructed by Network Manager 260 may pertain to looking-up the consumer at the credit bureau(s) based on the consumer's identity. The query may pertain to a passive, real-time multi-bureau prescreen-of-one inquiry and may be configured to verify whether the consumer is on an existing pre-approved/qualified customer list. Such a list can be derived by applying credit qualification criteria to information obtained from a credit bureau along with other financial, segmentation, and consumer response models. Third Party 280 may process the query as described below with reference to FIG. 8A and return with an appropriate message (e.g., decline) or prescreened offer(s). Network Manager 260 may store the responses received from the third party advertisers. If there is at least one offer, Network Manager 260 operates to construct an appropriate response in a format that is compatible with RPC 130 and send it to RPC 130. If no offer is received and there is/are additional destination(s), Network Manager 260 may operate to determine the next destination(s) based upon the program rules and offer hierarchy as described above. If there are no additional destinations or the process is timed out, a negative response is sent back to RPC 130.

FIG. 5 shows Screenshot 500 illustrating step 201 of FIG. 2, according to one embodiment of the invention. In this example, Consumer 120 is a Sprint® PCS customer eligible for a $50 rebate that can be redeemed online. Consumer 120 may visits Sprint® PCS's website and navigates to the functionality which handles the rebate fulfillment/cross-sell process. The rebate cross-sell functionality can be seamlessly implemented into an established online store or service center of a rebate sponsor or rebate processor. As described above, the various implementations as well as the underlying activities of Rebate Cross-Sell System 200 can be transparent to users. Thus, it would appear to Consumer 120 that Sprint® PCS is providing an opportunity to maximize his/her rebate via the opt-in option at the bottom of Screenshot 500.

Figure 6:
FIG. 6 is a diagrammatic representation of a screenshot illustrating another step in the online rebate redemption process of FIG. 5, according to one embodiment of the invention.

FIG. 6 shows Screenshot 600 which follows the example of FIG. 5 and illustrates disbursement options for Consumer 120. In this case, Consumer 120 can choose to (1) receive by mail a check in the amount of $50, which is the full value of the rebate, (2) increase the value of the rebate to $59.99 by redeeming it in exchange for a bundle of the primary products of Sprint® PCS, (3) increase the value of the rebate to $80.00 by redeeming it in exchange for the secondary product(s) (e.g., a pre-approved credit card) offered by a third party advertiser, or (4) increase the value of the rebate to $89.99 by redeeming it in exchange for a combination of the primary and secondary products.

FIG. 7 shows Screenshot 700 which further exemplifies different types of offers that can be presented to a qualified rebate-redeeming consumer during an online rebate claim/fulfillment process, according to one embodiment of the invention. In this example, the disbursement options and payment mechanisms are significantly diversified. For example, in addition to the four types of disbursement options described above with reference to FIG. 6, a rebate-redeeming consumer can choose whether to donate all of the rebate or a portion thereof. Additionally, each option is displayed with an approximate redemption time frame (e.g., 24 hours, 7 days, or 10 weeks).

Figure 8B:
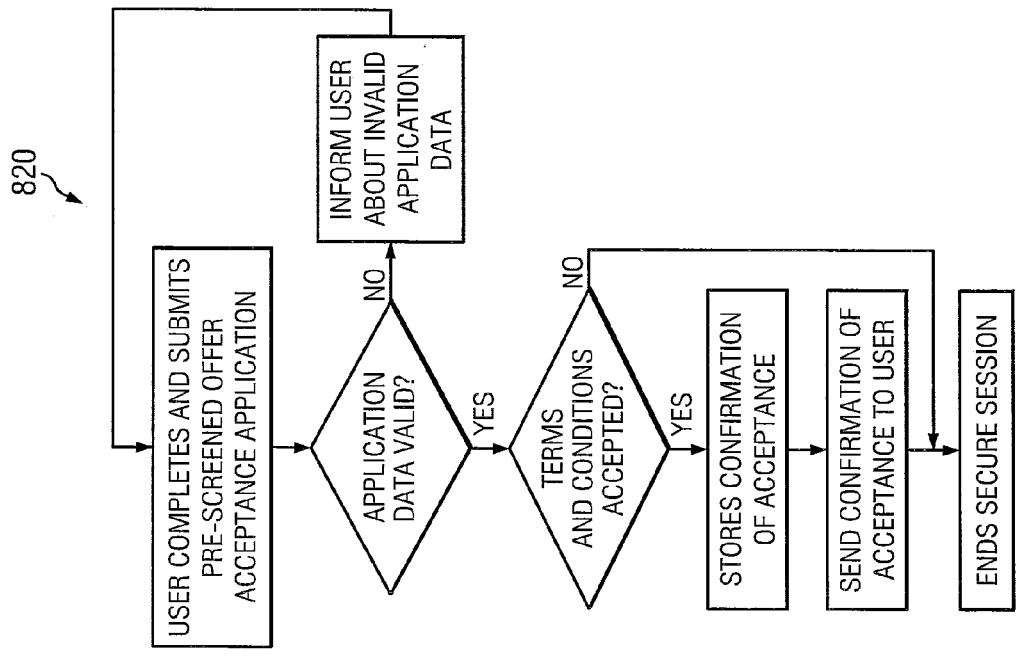
FIGS. 8A and 8B are flow diagrams representing the functionality of a third party system, which is integrated in a rebate cross-sell network for providing targeted offers to qualified rebate-redeeming consumer during an online rebate redemption process, according to one embodiment of the invention.
Figure 8A:
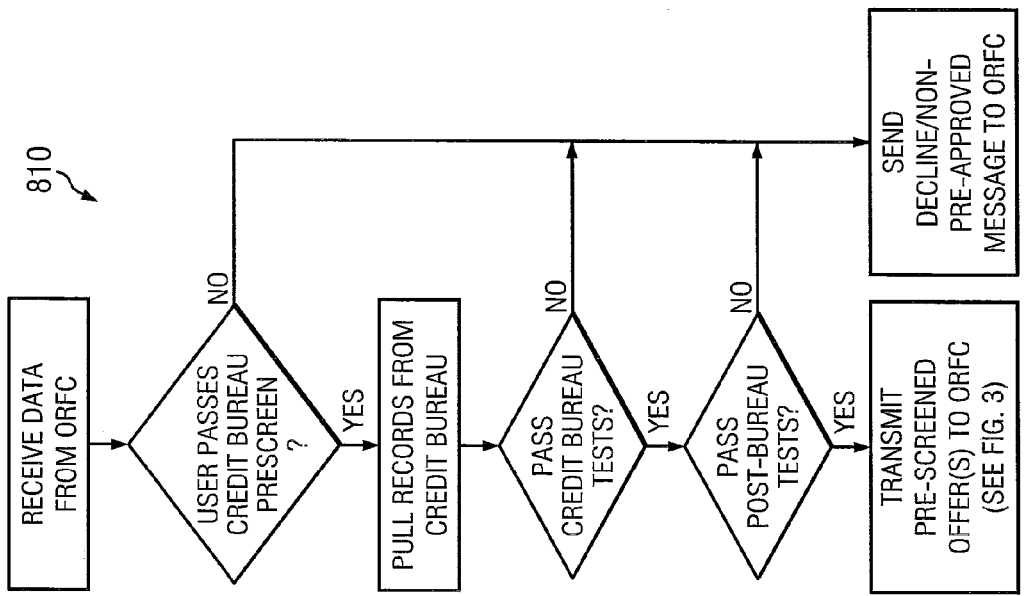

FIG. 8A shows a flow diagram 810 representing an aspect of the functionality of a third party system. Embodiments of the invention can integrate targeted financial product offers (e.g., pre-approved/pre-qualified credit card offers) into a rebate cross-sell network. Prescreen(s) can be applicable in situations where a consumer's credit bureau data is utilized to determine if a product or service offer would be extended and/or where a consumer's name is utilized to determine whether he/she is already on a list of prospects, which may be derived in part by the use of credit bureau or customer relationship data. In the offline world, most financial service providers have migrated to leveraging credit bureau and customer relationship data to make targeted prescreened offers specifically to desired prospects.

As an example, based on information received from a rebate cross-sell network manager (e.g., Network Manager 260) or a rebate fulfillment center integrating the rebate cross-sell network manager (e.g., ORFC 230), the third party system (e.g., Advertiser 280 or a credit decisioning platform) may operate to determine whether a rebate-redeeming consumer (e.g., Consumer 120) passes the credit bureau prescreen(s). Following the example shown in FIG. 2, if Consumer 120 passes prescreen(s), his/her record(s) is/are pulled from credit bureau(s) for more comprehensive test(s). As illustrated in FIG. 8A, in this example, Advertiser 280 may operate to put together prescreened offer(s) and send a positive response containing the prescreened offer(s) back to Network Manager 260 or ORFC 230 only if Consumer 120 passes the prescreen(s), credit bureau tests, and post-bureau tests. If Consumer 120 does not pass any one of the prerequisites, Advertiser 280 returns a negative response to Network Manager 260 or ORFC 230.

FIG. 8B shows a flow diagram 820 representing another aspect of the functionality of the third party system of FIG. 8A. As described above, if an optional opt-in step is implemented, Consumer 120 may be transferred to a website of the third party system with and without opt-in information. In the former case, the transfer may be transparent to Consumer 120 and third party offers may be presented in exchange for the original rebate that Consumer 120 is redeeming. In the latter case, Consumer 120 is likely to be aware of the transfer and a transaction between Consumer 120 and Advertiser 280 can take place directly without affecting the original rebate. If the optional opt-in step is not implemented, Consumer 120 cannot bypass the rebate cross-sell process.

Following the example of FIG. 3, User completes and submits the pre-screened offer confirmation application. Alternatively, if the optional opt-in step is implemented and User does not opt-in, this step may involve User completing and submitting a regular application. Application data is then checked for validity. If the application data is invalid, User is asked to submit the data missing or incorrect in any required fields. If the application data is valid, the third party system (e.g., the credit decisioning platform or Advertiser 280) presents the terms and conditions associated with the application and/or the offer. If User accepts the terms and conditions, an electronic confirmation of the acceptance is stored and a copy of which is transmitted back to User (e.g., via ORFC 230 or Network Manager 260 and RPC 130). Finally, ORFC 230 (Network Manager 260) ends the secure session with Advertiser 280, and completes any remaining steps in Consumer 120's rebate redemption experience.

One significant advantage of this invention is that it enables financial institutions to effectively identify and present targeted credit offers to a large volume of desirable, highly motivated consumers in a very cost effective way that will not appear to be obtrusive to a consumer as he/she is already in the middle of a financial transaction. It should also be noted that this process can be an entirely passive process that will transparently run in the background, and has no impact on the consumer's credit rating. Unlike systems that simply track referral-based electronic commerce, this system enables an attractive marketing opportunity that does not exist in today's environment. Furthermore, by providing the ability to integrate credit offers into the computer-aided rebate processing experience, financial institutions can significantly increase their ability to confidently identify prospective customers and make targeted credit offers to these highly motivated rebate-redeeming consumers who are already in the process of completing a financial transaction. The commerce created by this integration could prove to be a highly attractive sales channel for financial institutions attempting to reach consumers via the Web.

Because the rebate cross-sell system disclosed herein can be entirely passive, financial institutions and participating manufacturers/retailers can minimize the negative customer experience associated with extending a credit offer to an existing customer, only to have that customer declined. Being able to target consumers more effectively online can provide a significant advantage to financial service firms in acquiring customers online.

In summary, embodiments of the invention can place a new functional entity, a Rebate Cross-Sell Network Manager, in the rebate redemption process. This new functionality has the ability to receive an online rebate request and introduce a cross-selling opportunity to a consumer seeking to fulfill the rebate. Embodiments of the present invention include at least the following unique features:

1) offering/selling third party products/services to rebate-redeeming consumers;

2) selling other products (third party or rebate sponsor products) regardless of whether the rebate transaction itself is successful (i.e., product sales can be done/offered independent of the rebate transaction and not tied to the rebate itself or related to the product that is the subject of the rebate);

3) a combination of offering/selling third party products/services to rebate-redeeming consumers during the processing of a rebate transaction and selling products despite of the rebate transaction itself;

4) sharing/distributing in a number of ways the profit from additional product/service sales amongst the various parties in the rebate processing and cross-sell network (e.g., network manager, rebate sponsor, customer, third party partners); and 5) donations to charitable organizations during a rebate redemption process. In addition to creating cross-sell opportunities for parties (e.g., third party advertisers) outside of the primary demand chain, the disclosed rebate cross-sell network can also enable consumers to donate all or a portion of their rebate(s) to charitable organizations. Charitable organizations are unique, because there is no cross-selling per se. These donations can be a "disbursement option" from an advertiser.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. Accordingly, the scope of the invention should be determined by the following claims and their legal equivalents.

What is claimed is:

1. A method of cross-selling products over a network of interconnected computers during a rebate redemption process, comprising:

at a Rebate Processing Center computer:

processing a rebate, wherein said rebate is associated with an item or service and wherein said rebate is submitted by a consumer for redemption after said consumer makes a purchase of said item or service; and in addition to processing said rebate, presenting a cross-sell offer to said consumer, comprising:

at said Rebate Processing Center computer, collecting rebate redemption information during said rebate redemption process, wherein said collected rebate redemption information comprises information about said consumer;

generating a query intended for a Cross-Sell Network Manager computer based at least in part on said collected rebate redemption information about said consumer collected during said rebate redemption process; and sending said query to the Cross-Sell Network Manager computer connected to said Rebate Processing Center computer;

at said Cross-Sell Network Manager computer:

receiving said query from said Rebate Processing Center computer;

analyzing said collected rebate redemption information contained in said query from said Rebate Processing Center computer;

generating one or more queries intended for one or more target systems based at least in part on said collected rebate redemption information about said consumer collected during said rebate redemption process; and sending said one or more queries to said one or more target systems connected to said Cross-Sell Network Manager computer in said network to obtain a cross-sell offer for said consumer;

at said one or more target systems:

receiving at least one of said one or more queries from said Cross-Sell Network Manager computer;

formulating a response to said Cross-Sell Network Manager computer based on said at least one of said one or more queries received from said Cross-Sell Network Manager computer, wherein said response contains at least one cross-sell offer for said consumer; and sending said response containing said at least one cross-sell offer for said consumer to said Cross-Sell Network Manager computer;

at said Cross-Sell Network Manager computer:

receiving said at least one cross-sell offer for said consumer from said one or more target systems;

analyzing said at least one cross-sell offer; and forwarding a response to said Rebate Processing Center computer, wherein said response to said Rebate Processing Center computer contains said cross-sell offer for said consumer; and at said Rebate Processing Center computer:

presenting to said consumer said cross-sell offer for said consumer.

2. The method according to claim 1, wherein said collected rebate redemption information about said consumer comprises personal information of said consumer and wherein said personal information of said consumer comprises a name, an address, a phone number, an email address, or a combination thereof.

3. The method according to claim 1, wherein said cross-sell offer presented to said consumer is not associated with said item or service.

4. The method according to claim 1, further comprising:

communicating a set of cross-sell offers from said one or more target systems to said consumer during said rebate redemption process;

said consumer selecting one of said set of cross-sell offers during said rebate redemption process; and said consumer receiving benefit of said selected cross-sell offer during said rebate redemption process, wherein at least one of said selected cross-sell offers must be accepted by said consumer during said rebate redemption process.

5. The method according to claim 4, wherein said selected cross-sell offer is a pre-qualified credit card offer for said consumer.

6. The method according to claim 4, wherein said set of cross-sell offers includes an option to donate a value associated with said post-purchase rebate to a charitable organization.

7. A method of cross-selling products over a network of interconnected computers during a rebate redemption process, comprising:

at a Rebate Processing Center computer:

processing a rebate, wherein said rebate is associated with an item or service and wherein said rebate is submitted by a consumer for redemption after said consumer makes a purchase of said item or service; and in addition to processing said rebate, presenting a cross-sell offer to said consumer, comprising:

at said Rebate Processing Center computer, collecting rebate redemption information during said rebate redemption process, wherein said collected rebate redemption information comprises information about said consumer;

analyzing said collected rebate redemption information;

generating one or more queries intended for one or more target systems based at least in part on said collected rebate redemption information about said consumer collected during said rebate redemption process;

sending said one or more queries to said one or more target systems connected to said Rebate Processing Center computer in said network to obtain a cross-sell offer for said consumer;

at said one or more target systems:

receiving at least one of said one or more queries from said Rebate Processing Center computer;

formulating a response to said Rebate Processing Center computer based on said at least one of said one or more queries received from said Rebate Processing Center computer, wherein said response contains at least one cross-sell offer for said consumer; and sending said response containing said at least one cross-sell offer for said consumer to said Rebate Processing Center computer; and at said Rebate Processing Center computer:

receiving one or more cross-sell offers for said consumer from said one or more target systems;

analyzing said one or more received cross-sell offers;

selecting from said one or more received cross-sell offers a set of cross-sell offers for said consumer, wherein said set of cross-sell offers comprises said cross-sell offer; and presenting to said consumer said cross-sell offer for said consumer.

8. The method according to claim 7, wherein said collected rebate redemption information about said consumer comprises personal information of said consumer and wherein said personal information of said consumer comprises a name, an address, a phone number, an email address, or a combination thereof.

9. The method according to claim 7, wherein said cross-sell offer presented to said consumer is not associated with said item or service.

10. The method according to claim 7, further comprising:
communicating a set of cross-sell offers from said one or more target systems to said consumer via said Rebate Processing Center computer during said rebate redemption process;
said consumer selecting one of said set of cross-sell offers during said rebate redemption process; and
said consumer receiving benefit of said selected cross-sell offer during said rebate redemption process.

11. The method according to claim 10, wherein at least one of said selected cross-sell offers must be accepted by said consumer during said rebate redemption process.

12. The method according to claim 11, wherein said selected cross-sell offer is a pre-qualified credit card offer for said consumer.

13. The method according to claim 10, wherein said set of cross-sell offers includes an option to donate a value associated with said post-purchase rebate to a charitable organization.

14. A system for cross-selling products over a network of interconnected computers during a rebate redemption process, comprising:
a Rebate Processing Center computer;
one or more target systems; and
a Cross-Sell Network Manager computer coupled to said Rebate Processing Center computer and said one or more target systems;
wherein said Rebate Processing Center computer is operable to:
process a rebate, wherein said rebate is associated with an item or service and wherein said rebate is submitted by a consumer for redemption after said consumer makes a purchase of said item or service; and
in addition to processing said rebate, present a cross-sell offer to said consumer, wherein presenting said cross-sell offer to said consumer comprises:
collect rebate redemption information during said rebate redemption process, wherein said collected rebate redemption information comprises information about said consumer;
generate a query intended for said Cross-Sell Network Manager computer based at least in part on said collected rebate redemption information about said consumer collected during said rebate redemption process; and
send said query to said Cross-Sell Network Manager computer;
wherein said Cross-Sell Network Manager computer is operable to:
receive said query from said Rebate Processing Center computer;
analyze said collected rebate redemption information contained in said query from said Rebate Processing Center computer;
generate one or more queries intended for said one or more target systems based at least in part on said collected rebate redemption information about said consumer collected during said rebate redemption process; and
send said one or more queries to said one or more target systems connected to said Cross-Sell Network Manager computer in said network to obtain a cross-sell offer for said consumer;
wherein said one or more target systems are operable to:
receive at least one of said one or more queries from said Cross-Sell Network Manager computer;
formulate a response to said Cross-Sell Network Manager computer based on said at least one of said one or more queries received from said Cross-Sell Network Manager computer, wherein said response contains at least one cross-sell offer for said consumer; and
send said response containing said at least one cross-sell offer for said consumer to said Cross-Sell Network Manager computer;
wherein said Cross-Sell Network Manager computer is further operable to:
receive at least one cross-sell offer for said consumer from said one or more target systems;
analyze said at least one cross-sell offer; and
forward a response to said Rebate Processing Center computer, wherein said response to said Rebate Processing Center computer contains said cross-sell offer for said consumer; and
wherein said Rebate Processing Center computer is further operable to:
present to said consumer said set of cross-sell offer for said consumer.

15. The system of claim 14, wherein said collected rebate redemption information about said consumer comprises personal information of said consumer and wherein said personal information of said consumer comprises a name, an address, a phone number, an email address, or a combination thereof.

16. The system of claim 14, wherein said cross-sell offer presented to said consumer is not associated with said item or service.

17. The system of claim 14, wherein said cross-sell offer is one of a set of cross-sell offers from said one or more target systems that are communicated to said consumer during said rebate redemption process, wherein one of said set of cross-sell offers is selected by said consumer during said rebate redemption process, and wherein said consumer receives benefit of said selected cross-sell offer during said rebate redemption process.

18. The system of claim 17, wherein said selected cross-sell offer is a pre-qualified credit card offer for said consumer.

19. The system of claim 17, wherein said set of cross-sell offers includes an option to donate a value associated with said post-purchase rebate to a charitable organization.

20. A computer program product comprising a non-transitory computer readable storage medium storing computer instructions executable by a processor to implement a method of cross-selling products over a network of interconnected computers during a rebate redemption process in which a rebate associated with an item or service is submitted by a consumer for redemption after said consumer makes a purchase of said item or service, wherein, in addition to processing said rebate, said computer instructions comprise:
code for collecting rebate redemption information during said rebate redemption process, wherein said collected rebate redemption information comprises information about said consumer;
code for analyzing said collected rebate redemption information;
code for generating one or more queries intended for one or more target systems based at least in part on said collected rebate redemption information about said consumer collected during said rebate redemption process;
code for sending said one or more queries to said one or more target systems in said network to obtain cross-sell offers for said consumer;
code for receiving one or more cross-sell offers for said consumer from said one or more target systems;

code for analyzing said one or more received cross-sell offers; and code for selecting a set of cross-sell offers for said consumer, wherein said set of cross-sell offers comprises a subset of said one or more received cross-sell offers; and code for dynamically presenting to said consumer during said rebate redemption process said set of cross-sell offers for said consumer.

21. The computer program product of claim 20, wherein said collected rebate redemption information about said consumer comprises personal information of said consumer and wherein said personal information of said consumer comprises a name, an address, a phone number, an email address, or a combination thereof.

22. The computer program product of claim 20, wherein said set of Gross-sell offers comprises a plurality of cross-sell offers for said consumer from said one or more target systems, wherein said plurality of cross-sell offers are not associated with said item or service.

23. The computer program product of claim 20, wherein one of said set of cross-sell offers is selected by said consumer during said rebate redemption process and wherein said consumer receives benefit of said selected cross-sell offer during said rebate redemption process.

24. The computer program product of claim 20, wherein said selected cross-sell offer is a pre-qualified credit card offer for said consumer.

25. The computer program product of claim 20, wherein said set of cross-sell offers includes an option to donate a value associated with said post-purchase rebate to a charitable organization.

\* \* \* \* \*